S. M. RHOADS.
HOSE COUPLING.
APPLICATION FILED DEC. 24, 1907.

980,677.

Patented Jan. 3, 1911.

Witnesses
F. L. Gibson.
R. M. Smith.

Inventor
Samuel M. Rhoads.
By Victor J. Evans
Attorney

UNITED STATES PATENT OFFICE.

SAMUEL M. RHOADS, OF PHILADELPHIA, PENNSYLVANIA.

HOSE-COUPLING.

980,677.   Specification of Letters Patent.   Patented Jan. 3, 1911.

Application filed December 24, 1907. Serial No. 407,903. (Model.)

*To all whom it may concern:*

Be it known that I, SAMUEL M. RHOADS, a citizen of the United States, residing at Philadelphia, in the county of Philadelphia and State of Pennsylvania, have invented new and useful Improvements in Hose-Couplings, of which the following is a specification.

This invention relates to hose couplings and has for its object to provide a simplified and improved coupling for the purpose stated which will insure a tight joint and which will enable the sections of a hose to be readily connected and disengaged.

With the above general object in view, the invention consists in the novel construction, combination and arrangement of parts hereinafter fully described, illustrated and claimed.

Figure 1:
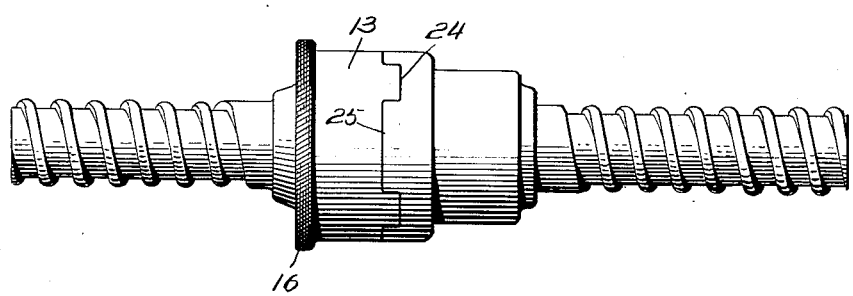
Figure 2:
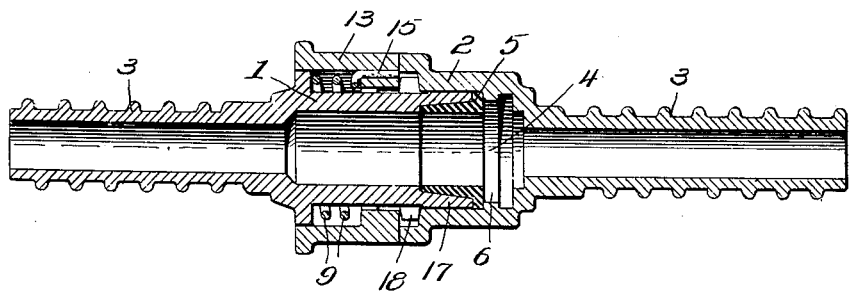
Figures 3, 4:
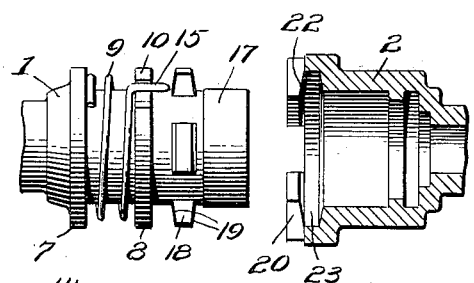
Figure 5:
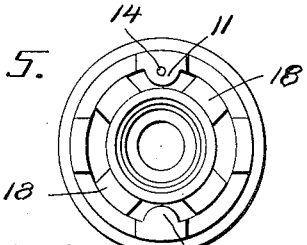
Figure 6:
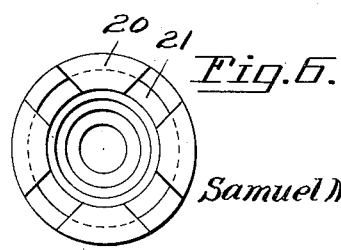

In the accompanying drawings:—Figure 1 is a plan view of a hose coupling embodying the present invention. Fig. 2 is a longitudinal section through the same. Fig. 3 is a plan view of one of the sections. Fig. 4 is a sectional view of the complemental section. Fig. 5 is a face view of the sections shown in Fig. 3, showing also the inclosing sleeve. Fig. 6 is a face view of the complemental section.

The hose coupling comprises an inner section 1 and an outer section 2 adapted to fit one within the other, as shown in Fig. 2, each of said sections being provided with a threaded or serrated stem 3 upon which the end of a flexible hose is adapted to be placed and held.

The inner section 1 fits snugly into the outer section 2 and has its extremity internally rabbeted as shown in Fig. 2 to receive a detachable and renewable gasket 4 which has a cylindrical bore and a tapering or conical outer surface as clearly shown in Fig. 2, said gasket being also provided at its extreme end with a circumferential flange 5 which is adapted to be compressed between the extreme edge of the inner section 1 and an internal annular shoulder 6 formed within the outer sections 2. In this way a perfectly reliable and tight joint is established between the two interfitting members or sections of the coupling while the gasket is securely retained in place by one of the sections when the two sections are separated to break the joint.

The inner section 1 is provided with two annular flanges 7 and 8 forming spring seats between which is arranged a coiled spring 9 bearing at one end against one of the flanges and at the other end against the other flanges as clearly shown in Fig. 3. The flange or spring seat 8 is provided at opposite sides with notches 10 adapted to receive and interlock with inwardly extending and oppositely arranged lugs 11 and 12 on the inner surface of a ring or sleeve 13 in the form of a hollow cylinder which encircles the flanges 7 and 8 and rests and rides thereon. One of the inwardly extending lugs is provided with a hole 14 into which extends a laterally bent extremity 15 of the spring 9, whereby said spring is fastened at one end to the sleeve 13 and is adapted to exert its tension on the sleeve 13 and urge said sleeve toward the outer section 2 of the coupling. The interlocking lugs 11 and 12 and the notches 10 referred to, prevent any relative rotation between the inner section 1 and the sleeve 13, and the sleeve is further provided at the rear with a knurled bead or annular flange 16 to facilitate the handling thereof.

The extremity of the inner section 1 is slightly enlarged as shown at 17 and just back of the enlargement said section is provided with a circular series of radially projecting lugs 18; the opposite side faces of which are reversely beveled as shown at 19 for engagement with corresponding segment lugs 20 on the extreme edge of the outer section 2 of the coupling, the lugs 20 being located at a suitable distance apart to leave spaces 21 through which the lugs 18 pass to enable said lugs to be moved behind the segment lugs 20 for the purpose of effecting an interlocked engagement between the sections 1 and 2. The segment lugs 20 are beveled or chamfered on their inner faces as shown at 22 so as to coöperate with the beveled faces of the lugs 18 to produce a wedging or binding fit between the sections. Furthermore, the outer section 2 is provided with an annular lug receiving recess 23 in which the lugs 18 move as they pass behind the segment lugs 20.

The meeting edges of the sleeves 13 and the outer coupling section 2 are provided with interlocking projections 24 and 25 which are held in interlocking engagement by means of the spring 9 which acts, as previously stated, to urge the sleeve 13 toward the section 2.

To unlock the coupling, the sleeve 13 is slid back far enough to disengage the projections 24 and 25. Then one section of the coupling is turned relatively to the other section until the lugs 18 pass out of engagement with the segment lugs 20 whereupon the two sections of the coupling may be separated. To again couple the sections, the operation just described is reversed.

I claim:—

1. A hose coupling comprising a member provided with spaced flanges 7 and 8 and a circular series of outwardly projecting lugs 18, the flange 8 having notches in its edges, a second member adapted to receive the end portion of the first-mentioned member and provided with a series of inwardly projecting lugs to pass between and engage behind the lugs of the first-mentioned member, a spring actuated locking sleeve mounted upon the first-mentioned member and having projections to interlock with the notched flange 8 thereof, and terminal interlocking projections between the spring-actuated sleeve and the said member.

2. A hose coupling comprising complemental members 1 and 2, the member 1 having spaced flanges 7 and 8 and a circular series of outwardly extending projections 18, the flange 8 having notches 10 and the other member 2 adapted to receive the outer end portion of the member 1 and having inwardly extending projections 20 to pass between and engage behind the outwardly extending projections 18 of the member 1, and having an annular recess 23 to receive the said outwardly extending projections 18 and having an inner annular shoulder 6, a packing gasket fitted within the outer end of the member 1 and having an outer flange to come between the outer extremity of said member 1 and the said inner annular shoulder 6, a helical spring mounted upon the first-mentioned member between the annular flanges 7 and 8 thereof and having an end portion bent outwardly, and a sleeve 13 mounted on the member and inclosing the helical spring and the spaced flanges 7 and 8 and formed with projections 11 and 12 to enter the notches 10 of the flange 4, one of said projections receiving the outwardly bent end of the helical spring, and terminal interlocking projections between the sleeve 13 and member 2.

In testimony whereof I affix my signature in presence of two witnesses.

SAMUEL M. RHOADS.

Witnesses:
GUSTAVUS W. TIEL,
FRANCIS MCKERNAN.